United States Patent Office 2,966,411
Patented Dec. 27, 1960

2,966,411
PLASTIC SHORTENINGS AND MANUFACTURE THEREOF

Theodore J. Weiss, Park Forest, Ill., assignor to Swift & Company, Chicago, Ill., a corporation of Illinois No Drawing. Filed Aug. 14, 1958, Ser. No. 754,932

15 Claims. (Cl. 99—118)

The present invention relates in general to a new and improved plastic shortening containing predominantly tallow, and the process for producing that shortening.

Plastic shortenings are produced by one of two general methods. Either untreated oil is blended with a small amount of a highly hydrogenated fat commonly called hard stock, or fats of different degrees of hydrogenation are blended together. The problem of the manufacturer of the shortening is to arrive at a blend which is of proper consistency and relatively long plastic range, i.e., a product showing a minimum change in consistency with change in temperature. Tallow has been used as an ingredient of shortening. However, tallow has been considered to be too hard a fat to be used as a major ingredient of a plastic shortening and shortenings incorporating tallow usually contain less than 50 percent tallow blended with a vegetable oil. Such blends are then usually slightly hydrogenated to stabilize the soft oils against oxidation. The change in consistency with change in temperature of this type of product is generally too great (the product possesses a short plastic range) and therefore the hydrogenation is not carried as far as needed for shortening consistency and an amount of hard stock is added to lengthen the plastic range. In an effort to utilize greater amounts of tallow, it has been theorized that tallow could be softened until liquid at room temperature by molecular rearrangement with a material containing acetyl groups and then the product plasticized with a conventional hard stock.

Along with the problem of producing a shortening of relatively long plastic range, the manufacturer is confronted with the problem of oxidative stability of the finished product. Shortenings containing large amounts of oils of high iodine value possess poor keeping qualities because of the high degree of unsaturation. While hydrogenation can correct this, it may have undesirable effects on the plastic range and the manufacturer is forced to make some compromise between stability and plastic range.

It is an object of this invention to provide an improved shortening having a wide plastic range, which shortening creams faster than conventional shortenings.

Another object of the invention is to provide a plastic shortening which is resistant to oxidation.

A further object of my invention is to provide a plastic shortening containing tallow as a major ingredient.

A still further object of the invention is to provide a shortening wherein the degree of saturation of the material blended with the tallow is immaterial.

Another object is to provide a method for the manufacture of an improved plastic shortening possessing a desirable plastic range, good oxidative stability, and containing predominantly tallow.

Further objects and advantages will become apparent to one skilled in the art from the following description of my invention.

Broadly, the invention comprises the discovery that the addition of a small amount of a fat containing a major amount of acyl groups of acids containing 2–4 carbons, for example, an acetylated or butyrated fat, to tallow softens the tallow to shortening consistency, regardless of the degree of hardness of the acetylated or butyrated fat. The plastic range is increased to a useful shortening range and the product so formed has good cake baking characteristics and creams faster than other shortenings containing tallow. The acetylated and butyrated fats are more stable than the vegetable oils normally blended with tallow in the ordinary shortening, thus increasing the keeping qualities of the shortening produced without the necessity for subsequent hydrogenation. However, while not necessary, it has been found that the hydrogenation normally carried out upon tallow used in shortening manufacture can be carried out without altering the effect on the tallow of the acetylated or butyrated fat.

I have found that the type of glyceride which is acetylated or butyrated is immaterial. The treated fat may be solid or liquid at the time of blending and still produce the desired plastic range when blended with the tallow. Apparently, a glyceride containing one long chain acid group (10–22 carbons) and two short chain acid groups, when blended with the normal long chain glycerides of tallow, behaves independently of the specific groups. It seems immaterial whether the long chain acid is saturated or unsaturated and whether the short chain group contains two or four carbons. Apparently, it is the degree of acetylation or butyration which satisfactorily produces the requisite softening of the firm tallow. In this regard, I have found that any fat containing at least about 60 percent diacetylated monoglyceride or, more particularly, a mixture of diacetylated and monoacetylated glycerides in the proportions of about 60 di- and 40 mono- up to 95 di- and 5 mono- is satisfactory. These amounts are also applicable to the butyrated fats. It should be noted with regard to these fats that the butyrated fats give similar results to the acetylated fats when blended with tallow, although alone the butyrated fats are softer, possessing a lower solids content and having lower melting points.

I have found that anywhere from about 5 to about 20 percent of the acetylated or butyrated product can be added to tallow to produce the advantageous results previously discussed, with perhaps 10 to 15 percent being optimum. However, it should be noted that less than 5 percent of the acetylated or butyrated product could be added to the product if the use to which it is to be put can tolerate a firmer shortening. Amounts much in excess of 20 percent would cause the product to be softer than is usual for a shortening and therefore not preferred.

In preparing my novel shortening, I preferably interesterify a glyceride of a high molecular weight fatty acid and triacetin or tributyrin or some other source of an acetyl or butyryl ester. This interesterification is carried out in the presence of any of the low temperature interesterification catalysts known to the art. Examples of catalysts which can be used are the alkali metal alkoxides of monohydric alcohols containing less than five carbons, e.g., the sodium, lithium, and potassium methoxides, ethoxides, propoxides, and butoxides. When the reaction is substantially complete, the excess triacetin or tributyrin is removed as by crystallization, distillation, etc., leaving a product with a major amount of diacetylated or dibutyrated monoglyceride and a minor amount of monoacetylated or monobutyrated diglyceride. The amount of acetyl or butyryl containing material that is added will determine the composition of the final product. Any amount of such materials which will produce a product containing at least about 60 percent diacetylated or dibutyrated monoglyceride is satisfactory for use in producing the product of my invention. While the foregoing procedure is eminently suitable for the preparation of the acetylated and butyrated fats useful in my invention, it is obvious that, rather than using triacetin or tributyrin, suitable nonglyceride esters of acetic and butyric acid may be used to acetylate or butyrate the fat. An example would be the use of methyl acetate or methyl butyrate. Rather than interesterify a triglyceride with the acetyl or butyryl containing material, it may be desirable to catalytically rearrange a monoglyceride, diglyceride, or mixture thereof. Noninteresterification acetylation or butyration of high molecular monoglycerides as by heating with acetic anhydride in the presence of sodium acetate, or by other means, is also suitable for my purposes. The process by which the acetylated and butyrated fats useful in my invention are prepared is not critical so long as the resulting product contains at least about 60 percent diacetylated or dibutyrated monoglyceride.

In a specific example, I interesterified ten parts by weight tallow with fifteen parts by weight triacetin (one mol tallow with six mols triacetin), using a 1 percent sodium methoxide catalyst at 100° C. When the reaction was complete, the excess triacetin was distilled off under vacuum, leaving a product containing approximately 80 percent diacetylated tallow monoglyceride and 20 percent monoacetylated tallow diglyceride. The following table was prepared from the results obtained by incorporating varying amounts of the acetylated tallow in an edible tallow. The shortenings obtained were tempered for 48 hours at 85° F. and held at each temperature reported for 48 hours before consistency measurements were made. The consistency measurements were determined on a Bloom consistometer.

*Table I*

| | Percent Acetyl Tallow in Tallow Base | | | | |
|---|---|---|---|---|---|
| | 0 | 5 | 10 | 15 | 20 |
| Consistency at ° F.: | | | | | |
| 60 | 165 | 102 | 84 | 70 | 58 |
| 75 | 75 | 51 | 37 | 27 | 19 |
| 85 | 50 | 41 | 28 | 19 | 12 |
| 95 | 35 | 33 | 25 | 18 | 10 |
| Change in Consistency Through Temperature Range | 130 | 69 | 59 | 52 | 48 |
| Solids Content Index at ° F.: | | | | | |
| 50 | 41 | 37 | 35 | 32 | 29 |
| 70 | 31 | 30 | 27 | 24 | 22 |
| 80 | 30 | 28 | 25 | 23 | 21 |
| 92 | 25 | 22 | 21 | 20 | 18 |
| 100 | 20 | 19 | 17 | 15 | 14 |
| Melting Point, ° F. (Capillary) | 119 | 118 | 117 | 117 | 116 |

It will be noted that the plastic range of the product containing the acetylated tallow is much longer (i.e., there is much less change in consistency with change in temperature) than with the tallow alone. Cakes baked and cake icings made with the acetylated shortenings were comparable with products produced using conventional shortenings. However, it was found that the addition of acetylated fats to tallow gave a product which creamed faster than before.

Table II lists the consistencies of five commercial shortenings and an acetylated tallow prepared by acetylating the tallow with 20 mol percent of triacetin for comparison purposes. It will be noted that in some cases these commercial preparations show a shorter and less desirable plastic range than is obtained from the acetylated formulation of my invention. The acetyl tallow is too soft to be considered a shortening.

*Table II*

| Product | Consistency at ° F. | | | | Change in Consistency Through Temperature Range |
|---|---|---|---|---|---|
| | 60 | 75 | 85 | 95 | |
| A | 105 | 42 | 25 | 17 | 88 |
| B | 130 | 39 | 23 | 16 | 114 |
| C | 97 | 49 | 34 | 22 | 75 |
| D | 83 | 38 | 20 | 14 | 69 |
| E | 72 | 37 | 25 | 18 | 54 |
| Acetyl tallow | 40 | 17 | 9 | 0 | 40 |

In evaluating the properties of the shortening product made following the method of my invention, the values listed in Table II for the commercial shortenings A–E may be used for comparison purposes. Values approximating those listed for the commercial shortenings are desirable as falling within the useful shortening range.

To show the applicability of my product using acetylated and butyrated fats other than tallow, I added varying amounts of each of (1) diacetylated fully hydrogenated cottonseed oil monoglyceride, (2) dibutyrated fully hydrogenated cottonseed oil monoglyceride, and (3) acetyl lard, a product comprising diacetylated lard monoglyceride, to tallow. Table III tabulates the results of such blends. The composition of the acetylated and butyrated products fell within the 60 di-, 40 mono- up to 95 di- and 5 mono- range.

*Table III*

| Product | Solids Content Indices at ° F. | | | | |
|---|---|---|---|---|---|
| | 50 | 70 | 80 | 92 | 100 |
| 1. Diacetylated fully hydrogenated cottonseed oil monoglyceride | 65 | 59 | 43 | 0 | 0 |
| 2. Dibutyrated fully hydrogenated cottonseed oil monoglyceride | 41 | 0 | 0 | 0 | 0 |
| 3. Tallow | 39 | 31 | 28 | 24 | 19 |
| 4. 95% tallow +5% (1) | 37 | 28 | 27 | 22 | 17 |
| 5. 90% tallow +10% (1) | 34 | 26 | 25 | 21 | 16 |
| 6. 85% tallow +15% (1) | 32 | 24 | 23 | 20 | 15 |
| 7. 80% tallow +20% (1) | 28 | 23 | 22 | 18 | 14 |
| 8. 95% tallow +5% (2) | 36 | 29 | 27 | 22 | 18 |
| 9. 90% tallow +10% (2) | 34 | 26 | 24 | 21 | 16 |
| 10. 85% tallow +15% (2) | 30 | 24 | 23 | 19 | 14 |
| 11. 80% tallow +20% (2) | 29 | 22 | 21 | 17 | 13 |
| 12. 95% tallow +5% acetyl lard | 36 | 29 | 27 | 23 | 17 |
| 13. 90% tallow +10% acetyl lard | 33 | 27 | 25 | 21 | 16 |
| 14. 85% tallow +15% acetyl lard | 30 | 25 | 23 | 19 | 14 |
| 15. 80% tallow +20% acetyl lard | 28 | 23 | 21 | 18 | 13 |

The above tabulation clearly brings out the similar effect on tallow using either an acetylated or butyrated fat even though the butyrated fat itself is a much softer product. Another interesting feature that should be noted is that when the diacetylated fully hydrogenated cottonseed oil monoglyceride, a sharply melting fat resembling hard butter, is blended with tallow, also a rather firm fat although never hard enough to be considered hard stock, the result is a blend which is considerably softer than either of the original components. Thus, it is not necessary to have an oil as the minor ingredient to be added to tallow in order to achieve the desirable results obtained by practicing my invention. It will be noted that in Table I the S.C.I. data correlate with consistency. While Table III lists only S.C.I. values, the consistency measurements for the various products would correlate therewith in a similar manner.

Obviously, many modifications and variations of the invention hereinbefore set forth may be made without departing from the spirit and scope thereof, and therefore only such limitations should be imposed as are indicated in the appended claims.

I claim:
1. A method for the manufacture of a shortening product having a wide plastic range and good creaming and cake baking characteristics which comprises adding to tallow a small amount of a mixture of glycerides containing a minor amount of long chain acid groups and a major amount of short chain acid groups having two to four carbons.

2. The method of claim 1 wherein at least about 5 percent by weight of the glyceride mixture is blended with the tallow.

3. The method of claim 1 wherein the glyceride mixture comprises a major amount of acetyl groups and a minor amount of acyl groups of high molecular weight fatty acids.

4. The method of claim 1 wherein the glyceride mixture comprises a major amount of butyryl groups and a minor amount of acyl groups of high molecular weight fatty acids.

5. The method of preparing a shortening product having a wide plastic range and containing predominantly tallow which comprises interesterifying a high molecular weight fat and a material containing esters of short chain fatty acids containing two to four carbons to an extent that the resulting interesterified mixture contains a minor amount of long chain fatty acid groups, and a major amount of short chain fatty acid groups, and blending a small amount of the interesterified fat with tallow.

6. The method of claim 5 wherein the esters of the short chain fatty acids are acetic esters.

7. The method of claim 5 wherein the esters of the short chain fatty acids are butyric esters.

8. The method of claim 5 wherein at least about 5 percent of the interesterified fat is mixed with at least about 80 percent by weight tallow.

9. A shortening possessing a wide plastic range and good creaming and baking characteristics which comprises at least about 80 percent by weight tallow and the remainder consists of a mixture of glycerides containing a minor amount of acyl groups of long chain fatty acids and a major amount of short chain acid groups having two to four carbons.

10. The product of claim 9 wherein the mixture of glycerides is an acetylated fat.

11. The product of claim 9 wherein the mixture of glycerides is a butyrated fat.

12. A shortening possessing a wide plastic range and good creaming and baking characteristics consisting of 90 percent tallow and 10 percent diacetylated lard monoglyceride.

13. A shortening product consisting essentially of acetylated tallow and at least about 80 percent tallow.

14. A shortening product consisting essentially of diacetylated fully hydrogenated cottonseed oil monoglyceride and at least about 80 percent tallow.

15. A shortening product consisting essentially of dibutyrated fully hydrogenated cottonseed oil monoglyceride and at least about 80 percent tallow.

References Cited in the file of this patent
UNITED STATES PATENTS

| | | |
|---|---|---|
| 2,614,937 | Baur et al. | Oct. 21, 1952 |
| 2,808,421 | Brokaw | Oct. 1, 1957 |

OTHER REFERENCES

Bailey: "Industrial Oil and Fat Products," 2nd edition, Interscience Publishers, Inc., New York (1951), pp. 238 and 239.